J. O. SCHMITT.
COMBINED STUFFING BOX AND SHAFT BEARING.
APPLICATION FILED JULY 19, 1911.
1,025,884.
Patented May 7, 1912.
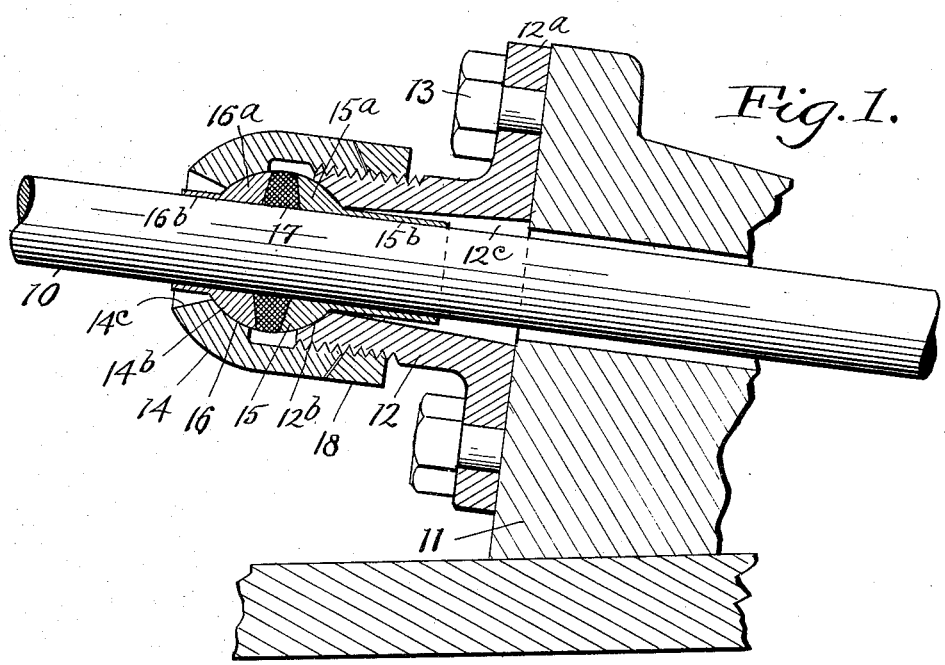
Fig.1.
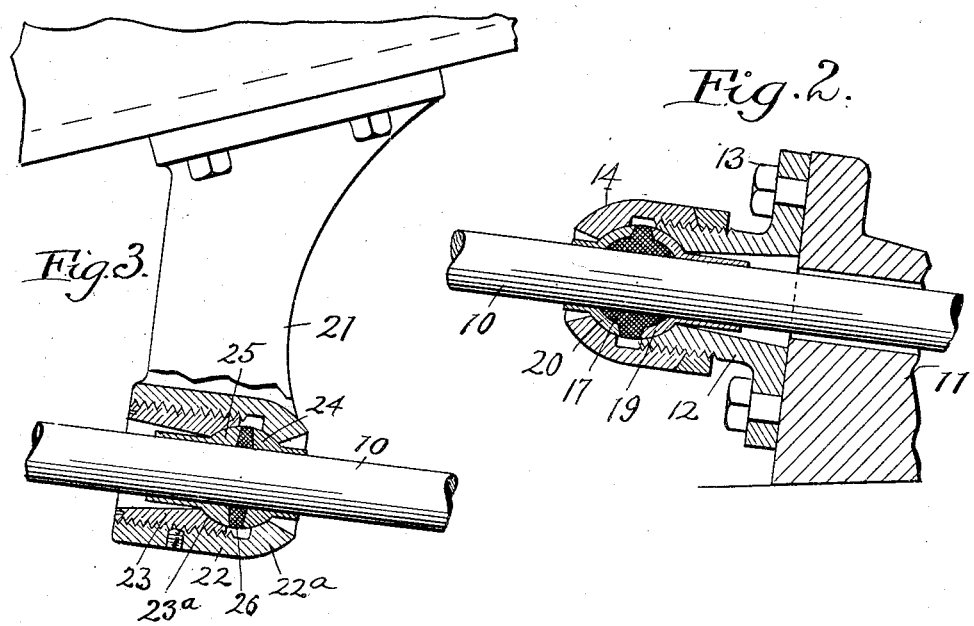
Fig.3.
Fig.2.
Witnesses.
E. B. Gilchrist
H. R. Sullivan
Inventor
John O. Schmitt
by Thurston & Kwis
Attys.

UNITED STATES PATENT OFFICE.

JOHN O. SCHMITT, OF CLEVELAND, OHIO.

COMBINED STUFFING-BOX AND SHAFT-BEARING.

1,025,884.  Specification of Letters Patent.  Patented May 7, 1912.

Application filed July 19, 1911. Serial No. 639,296.

*To all whom it may concern:*

Be it known that I, JOHN O. SCHMITT, a citizen of the United States, residing at Cleveland, in the county of Cuyahoga and State of Ohio, have invented a certain new and useful Improvement in Combined Stuffing-Boxes and Shaft-Bearings, of which the following is a full, clear, and exact description.
This invention relates to a combined stuffing box and shaft bearing adapted especially for use with propeller shafts of motor boats, the object being to provide a device of the character stated which is extremely efficient and not only prevents the leakage of water about the shaft, where leakage is very undesirable, but serves as an effective universal bearing, allowing freedom of movement to the shaft, even in the absence of true shaft alinement.

A further object is to provide a stuffing box and bearing which is compact, inexpensive and consists of few parts which are exceptionally simple in their construction and easy to assemble, or adjust to obtain the desired results.

The above and other objects are accomplished by my invention which may be briefly summarized as consisting in certain novel details of construction and combinations and arrangements of parts which will be described in the specification and set forth in the appended claims.

My invention is obviously not confined for use in connection with propeller shafts, but may be used for other purposes and under circumstances wherein the packing or stuffing box feature may or may not be of importance. However, propeller shafts present an excellent field of use for my invention, and I have accordingly shown in the drawings several embodiments of my invention wherein such use is exemplified.

In the drawings, Figure 1 is a sectional view of a portion of a boat, showing the shaft in elevation and equipped with a combined stuffing box and shaft bearing constructed in accordance with one form of my invention; Fig. 2 is a similar view illustrating a slight modification; and Fig. 3 is a further modification wherein the device is used in connection with the propeller shaft for a slightly different purpose than in the modifications shown in Figs. 1 and 2.

Referring now to Fig. 1, 10 represents the shaft which passes through shaft log 11 which may be of any shape or construction, and may be formed of wood or metal in accordance with any of the approved designs. At the point where the shaft emerges from the shaft log on the interior of the boat, I have provided a device constructed in accordance with my invention, this device including a stuffing box or stuffing box sleeve 12 provided with a flange $12^a$ through which pass a suitable number of bolts 13 for securing the device to the end of the shaft log. The sleeve 12 is threaded on the exterior and receives an adjustable gland or sleeve 14, the shaft 10 passing freely through the sleeve 12 and gland 14 in the well known manner. The sleeve 12 and gland 14 are provided near their ends with oppositely disposed spherical or spherically curved seats $12^b$ and $14^b$ respectively.

Within the stuffing box are two shaft bearing members 15 and 16 through which the shaft passes, and in which the shaft has the required loose or working fit. These bearing members 15 and 16 are provided with spherically curved bearing heads $15^a$ and $16^a$ which bear respectively upon the spherically curved seats $12^b$ and $14^b$ of the stuffing box sleeve and gland. To provide ample bearing surface for the shaft 10, these members 15 and 16 are preferably provided with tubular bearing extensions $15^b$ and $16^b$, and to accommodate the movement of these extensions within the stuffing box, or to permit a more or less universal movement of the shaft, the stuffing box sleeve and gland are tapered to provide clearance, as indicated at $12^c$ and $14^c$ respectively. These bearing members 15 and 16 are separate members not mechanically united, and when in normal position are spaced apart, leaving an annular space about the shaft, between the adjacent faces of the members. The adjacent faces of the bearing members are preferably on a taper so that this space or slot between them is wider at the shaft than at a distance from the shaft. Between the bearing members I have placed packing material 17 which consists of any suitable composition which is preferably yieldable or plastic. Thus, it will be seen that when the gland 14 is tightened or adjusted to proper position, not only is universal shaft movement permitted, but the packing material is squeezed toward the shaft and forced against the same so tightly that the leakage of water through the stuffing box along the shaft is absolutely prevented. At the same time by properly machining the spherical surfaces, leakage between the bearing surfaces is also prevented. The gland may be held in any desired position of adjustment by means of a jam nut 18 which is also screwed onto the threaded exterior of the sleeve 12.

In Fig. 2 I have illustrated a form of my invention wherein the device performs the same functions as in the form shown in Fig. 1. In this figure, the stuffing box sleeve and gland have the same construction as shown in Fig. 1, but the bearing members here designated 19 and 20 are slightly different in construction. In this instance, the said members are provided with bearing heads which are in the form of spherically curved shells undercut in the manner illustrated, so that when the parts are in their proper relative positions, an annular and substantially spherical space is provided next to the shaft for packing material 17. It will be seen that with this form, not only can a greater amount of packing material be employed than in the form shown in Fig. 1, but by the adjustment of the gland, the material is forced toward the shaft with more pressure.

In Fig. 3 I have shown a modification which is quite similar in principle and construction to the form shown in Fig. 1, but which illustrates one of the uses of my invention in which the packing feature is of no importance. In this case, the invention serves as a universal bearing for that portion of the shaft which extends beneath the boat. The shaft is supported from the boat by a hanger 21 having at its lower end a tubular boss or sleeve 22 which corresponds to the sleeve 12 of Fig. 1. The sleeve 22 is threaded on the interior and receives an adjustable inner sleeve 23 which corresponds to the gland 14 of Fig. 1. The sleeves 22 and 23 are provided respectively with spherically curved seats 22ª and 23ª and these seats are engaged by two shaft bearing members 24 and 25, similar in all material respects to those shown in Fig. 1. These bearing members, as in the first instance, are separate members and are spaced apart and receive between them a filler 26 which may be of the same composition as the packing material 17.

It will thus be seen that my invention is susceptible of considerable modification and is adapted for a variety of uses, and I therefore do not wish to be confined to any particular construction, except as I am limited by the terms of the appended claims.

Having thus described my invention, what I claim is:

1. In combination, a stuffing box sleeve adapted to have a shaft extend therethrough, a gland adjustably connected to and supported by said sleeve, said sleeve and gland having a pair of separate annular seats, a bearing for the shaft comprising two separate members, each provided with a spherically curved portion engaging one of said seats and having between them packing composition which is compressed and forced toward the shaft by adjusting the gland along the sleeve.

2. In combination, a stuffing box sleeve adapted to receive a shaft and a gland having an adjustable screw connection with said sleeve, the sleeve and gland having a pair of oppositely disposed annular seats, two bearing members arranged within the stuffing box and having spherically curved outer surfaces, each of which engages one of said seats, said bearing members being separated by a space adapted to receive packing material and their adjacent faces being on a taper so that when the gland is adjusted along the sleeve, said bearing members are moved toward each other so as to force the packing material toward the shaft.

3. In combination, a sleeve having a support for holding the same in fixed relation with respect to a shaft and provided at its end with a spherically curved seat, a second sleeve having a threaded connection with said first named sleeve and having at its end a spherically curved seat opposite the first named seat, a combined bearing and packing comprising two parts having spherically curved heads, each of which engages one of the said seats and having oppositely extending tubular extensions forming shaft bearings, said members having between them packing material which is forced toward the shaft by the tightening of one sleeve on the other.

4. In combination, a sleeve having means for supporting the same in fixed relation with respect to a shaft and provided at its end with a spherically curved seat, a second sleeve having a threaded connection with said first named sleeve and having at its end a spherically curved seat opposite the first named seat, a combined bearing and packing comprising two parts having spherically curved heads, each of which engages one of the said seats and having oppositely extending tubular extensions forming shaft bearings, said members being spaced apart and having their adjacent faces tapered so as to form an annular slot about the shaft wider at the shaft than at a distance from the shaft, and yieldable material in said slot adapted to be forced toward the shaft as said bearing members are moved toward each other.

5. In combination, a stuffing box sleeve, a gland having a threaded connection therewith and adjustable thereon, said sleeve and gland having on the interior thereof two separate spherically curved seats, one on the sleeve and one on the gland, two shaft bearing members arranged in the stuffing box and provided with oppositely disposed spherically curved heads which engage said seats and provided also with oppositely extending tubular shaft bearings, yieldable material between said heads, the sleeve and gland being tapered opposite said bearing extensions so as to provide clearance therefor and permit universal movement.

6. In combination with a shaft, a pair of sleeves surrounding the shaft and one having threaded connection with the other, said sleeves having on the interior a pair of oppositely disposed spherically curved bearing seats, two bearing members for the shaft, each engaging one of said seats, said bearing members being spaced apart and having between their adjacent faces yieldable material which is compressed by the adjustment of one sleeve along the other.

In testimony whereof, I hereunto affix my signature in the presence of two witnesses.

JOHN O. SCHMITT.

Witnesses:
H. R. SULLIVAN,
A. F. KWIS.